United States Patent

[11] 3,558,825

[72] Inventor William W. Pharis
Rochester, N.Y.
[21] Appl. No. 637,220
[22] Filed May 9, 1967
[45] Patented Jan. 26, 1971
[73] Assignee Stromberg-Carlson Corporation
Rochester, N.Y.
a corporation of Delaware

[54] REVERTING CALL ARRANGEMENT
12 Claims, 6 Drawing Figs.

[52] U.S. Cl. .......... 179/17
[51] Int. Cl. .......... H04m 13/00
[50] Field of Search .......... 179/17.5, 17

[56] References Cited
UNITED STATES PATENTS

| | | | |
|---|---|---|---|
| 1,700,458 | 1/1929 | Waller | 179/17 |
| 2,335,473 | 11/1943 | Bakker | 179/17 |
| 2,541,362 | 2/1951 | Jones | 179/17 |
| 2,832,833 | 4/1958 | Jones et al. | 179/17 |
| 2,595,944 | 5/1952 | Hersey | 179/17 |
| 2,604,539 | 7/1952 | Duhamel et al | 179/17 |
| 3,376,391 | 4/1968 | Finkhauser et al | 179/16 |

*Primary Examiner*—Kathleen H. Claffy
*Assistant Examiner*—Jan S. Black
*Attorney*—Charles C. Krawczyk

ABSTRACT: A reverting call arrangement providing a reverting call-ringing control and a calling code register on a time share basis separate from the required reverting call trunk with the calling code register and reverting call-ringing control both providing special supervisory tone signals to the subscriber line circuit and the calling code register having a special timing circuit for automatic release thereof.

W. W. PHARIS
INVENTOR

BY Dicke & Craig
ATTORNEYS

REVERTING CALL ARRANGEMENT

BACKGROUND OF THE INVENTION

In telephone exchanges having party lines, it very often happens that a subscriber finds it necessary to call the subscriber with whom he shares the line circuit. This type of call is known as a reverting call, and requires special equipment to indicate to the telephone exchange that the called and calling line circuits are identical and to provide battery feed and proper ringing and supervisory control for the respective subscriber equipment.

In certain known switching systems a comparison is made for each call initiated prior to completion thereof between the equipment numbers of the calling and called parties to determine whether or not the call is a reverting-type call. If the call is determined as being a reverting-type call, a reverting call trunk is connected to the line circuit and further processing of the call including application of ringing to both the calling and called parties is derived from this special trunk.

For purposes of economy of operation, a telephone system must be designed to meet the requirements of a specific locality without providing equipment in excess of that absolutely necessary. The amount of equipment necessary to provide a certain degree of service is a direct function of the amount of telephone calls that the users will make. The observations of traffic load in existing equipment have led to certain conclusions, which provide means of calculation for establishing the minimum equipment necessary to provide the telephone service desired. Sharing of equipment between existing calls enables a small amount of central office equipment to serve a large number of subscribers. Obviously, if service equipment is made available for only a single call at a time, much of it would stand idle for long periods of time after it has performed its function. Under certain circumstances, where the equipment is very inexpensive, this type of operation is acceptable; however, where complicated and expensive service equipment is utilized, it is certainly advantageous to reduce the amount of this equipment needed by providing it on a time share basis.

In known reverting call arrangements, as indicated above, the special reverting call trunk provides for complete control over completion of the connection between subscribers including the application of appropriate ringing alternately to the calling and called subscribers, timing functions, answer detection, and reverting call indication to the answering called party. Thus, the special reverting call trunk is the most expensive portion of the known system, and this trunk, due to the nature of its function, must necessarily be connected to the line circuit continuously as long as the call remains established. Thus, in the known arrangement, extremely expensive equipment is tied up for long periods of time thereby increasing the overall cost of the exchange equipment.

BRIEF DESCRIPTION OF THE INVENTION

The present invention therefore proposes a removal from the special reverting call trunk of the reverting call-ringing control and calling code register and the provision of this equipment as separate time-shared elements in the telephone exchange. The reverting call-ringing control and calling code register are the most expensive portions of the reverting call trunk and are utilized during only a small portion of the time allocated to each reverting call. Thus, by providing this equipment as separate time-shared equipment, a fewer number of ringing controls and calling code registers would be necessary than the number of reverting call trunks normally provided at the exchange. The time sharing of this equipment therefore considerably reduces the cost of the reverting call equipment at the exchange by making maximum use of this equipment on a time share basis separate from the relatively inexpensive reverting call trunk equipment.

In brief, the present invention provides a reverting call trunk connected through the trunk link network, universal junctor, and line link network to the line circuit for purposes of establishing a reverting call. In addition, a separate reverting call-ringing control and a calling code register are provided on a time share basis via the service link network and universal junctor for purposes of providing the proper tone signals to both the calling and called parties, indicating to the calling party the time for dialing his own identifying number and indicating to the called party upon answer the fact that the call is reverting call. In addition, the reverting call-ringing control provides for proper ringing of both the called and calling parties alternately. Once the call has been established, both the reverting call-ringing control and the calling code register are released and made available for other reverting calls. In fact, the calling code register proposed by the present invention includes a timing means which insures that this register will not be associated with a call for longer than a predetermined time plus the time for dialing a single digit.

It is therefore an object of the present invention to provide a reverting call arrangement for telephone exchanges which completely eliminates or otherwise substantially avoids all of the drawbacks inherent in known systems of a similar nature.

It is another object of the present invention to provide a reverting call arrangement for telephone systems which is made extremely more economical through time sharing of equipment.

These and other objects, features and advantages of the present invention will become more apparent from the following detailed description thereof when taken in conjunction with the accompanying drawings wherein.

Figure 1:
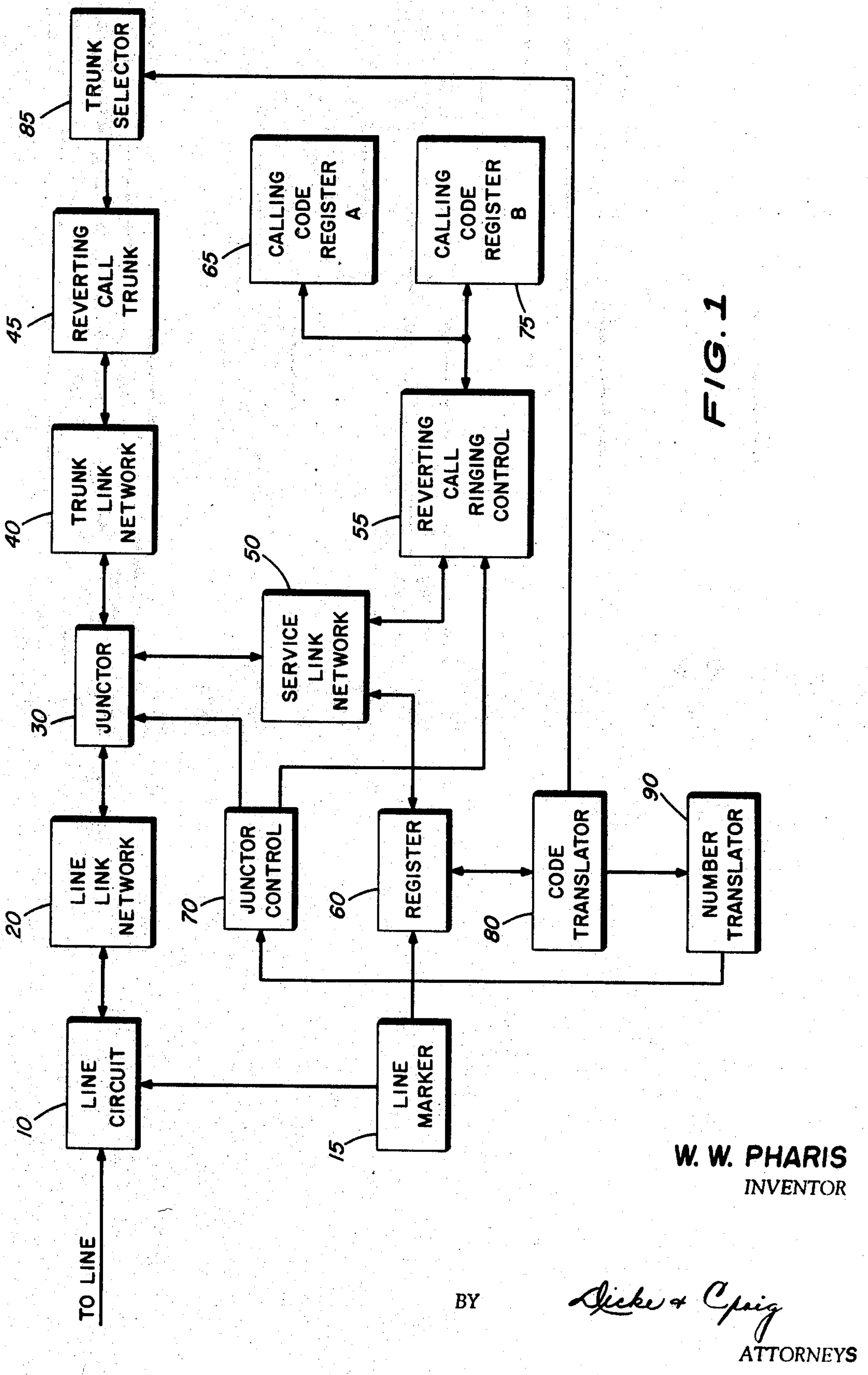
FIG. 1 is a schematic block diagram of a telephone system incorporating the features of the present invention.
Figure 3A:
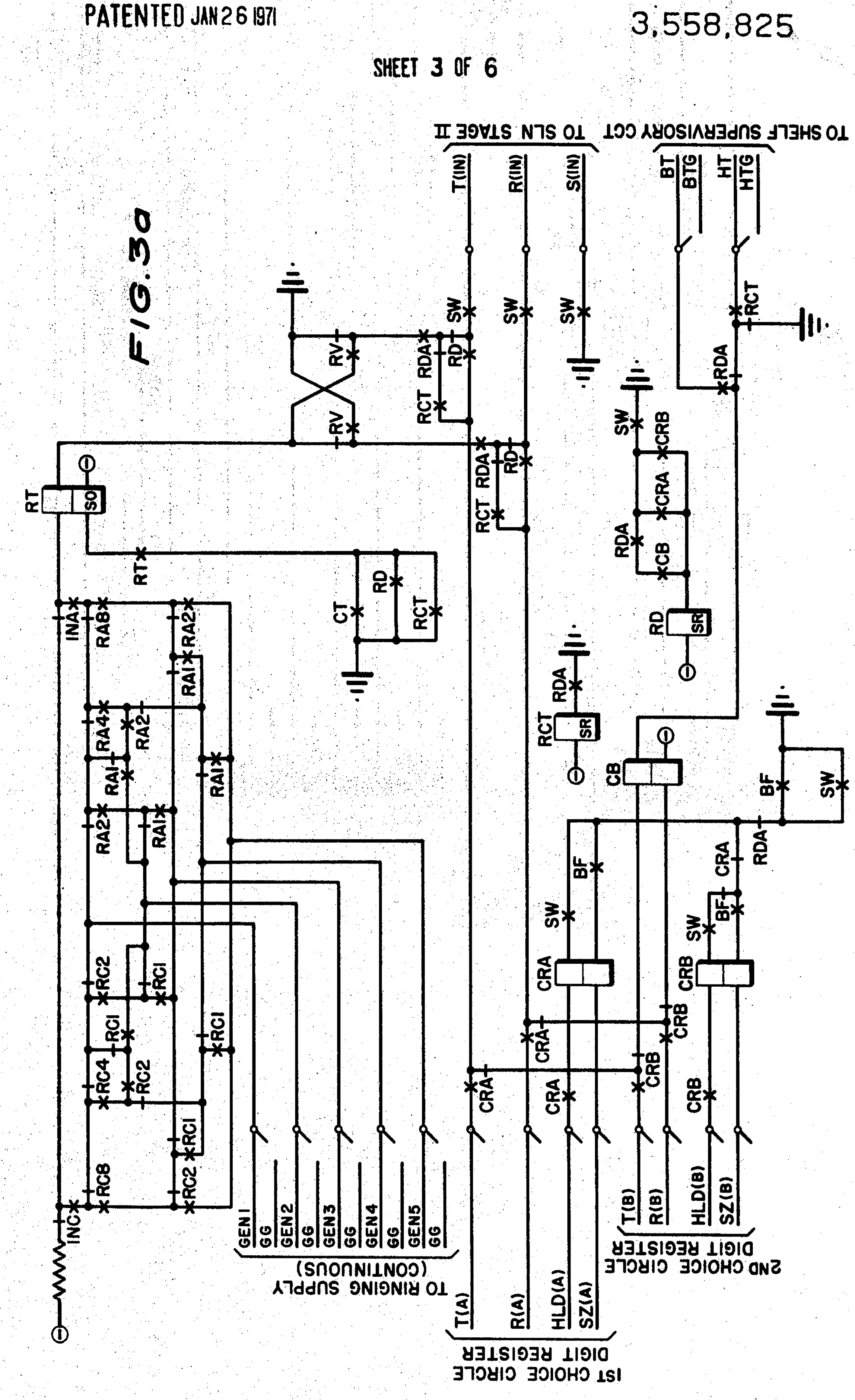
Figure 3B:
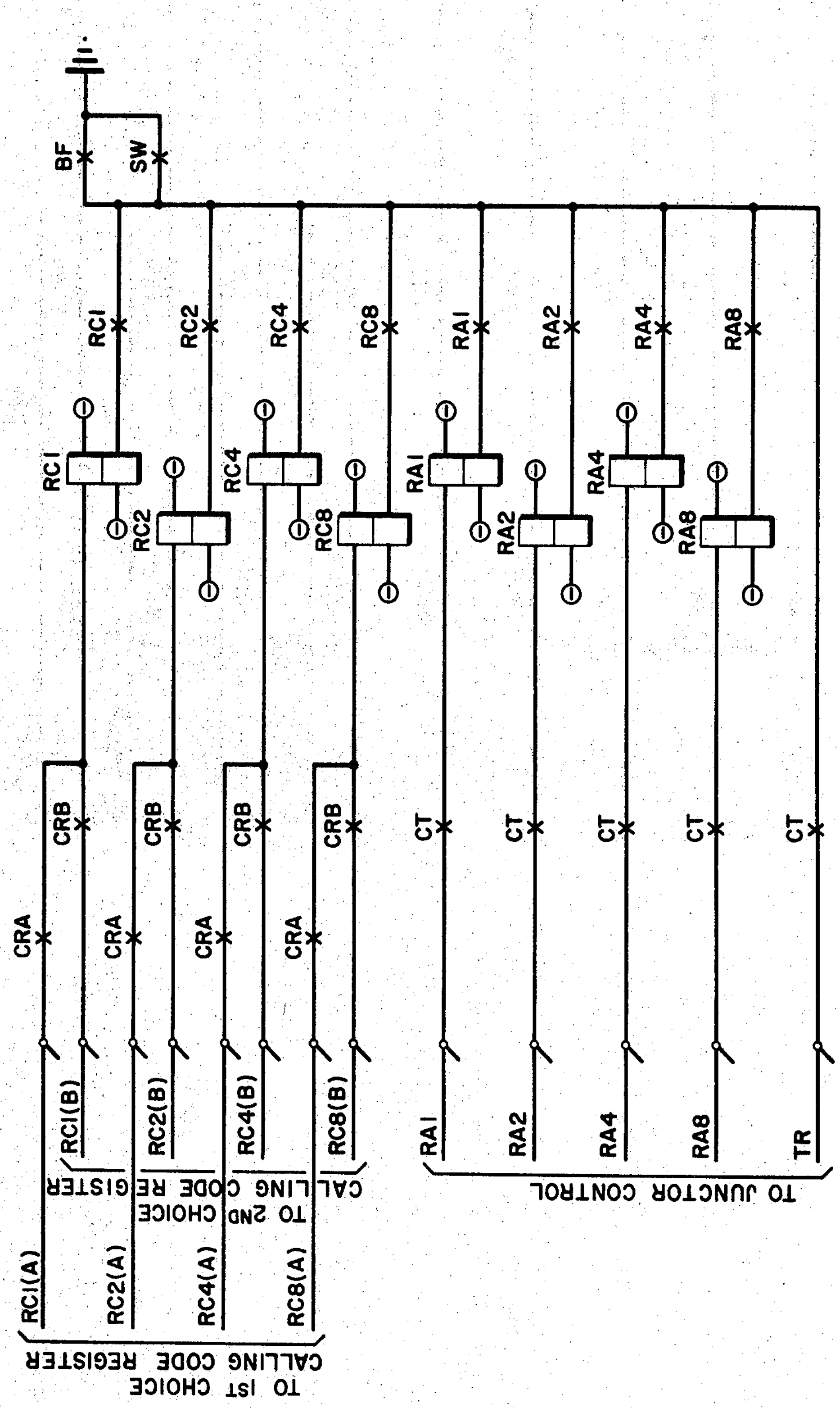
Figure 3C:
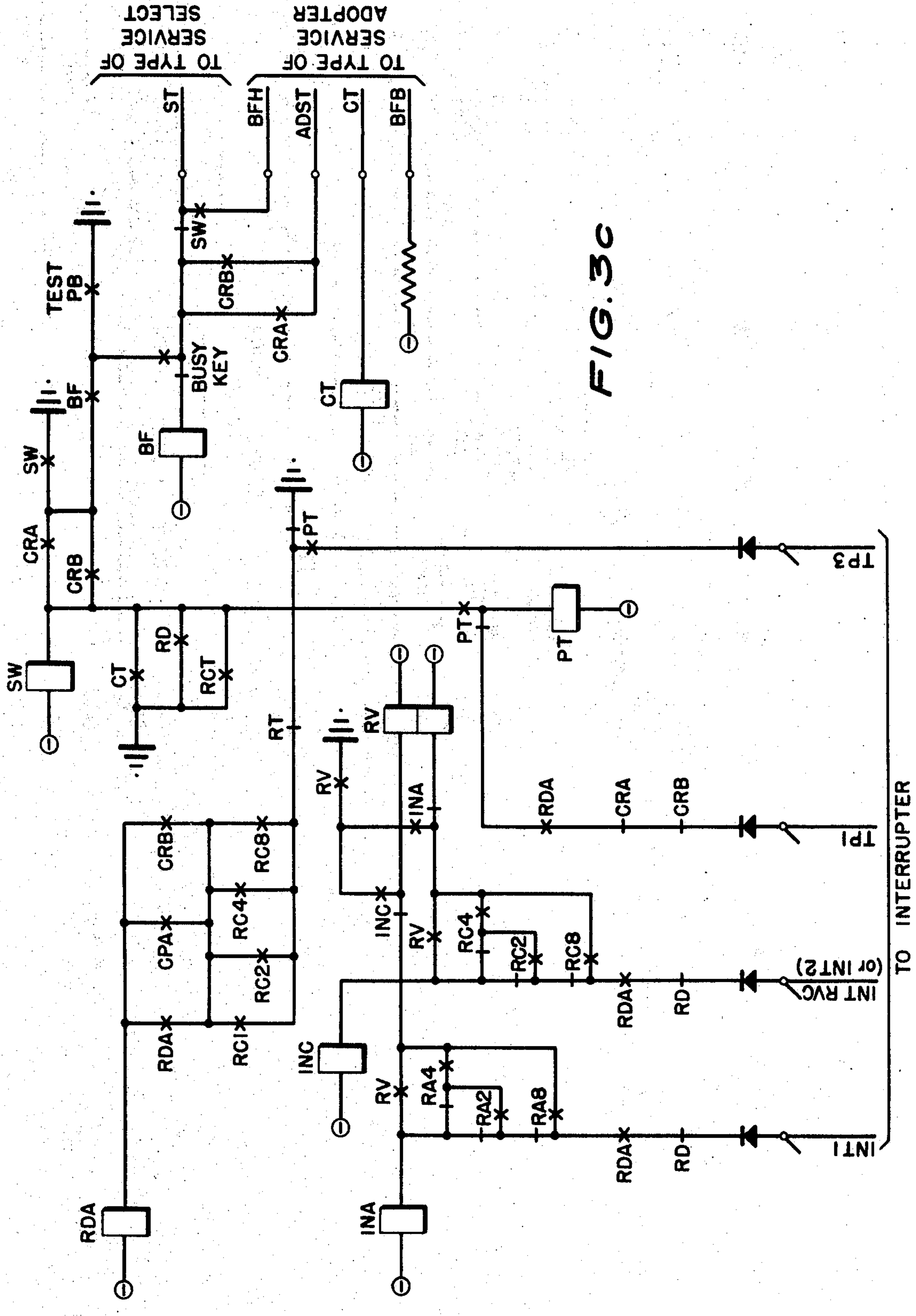
Figure 4:
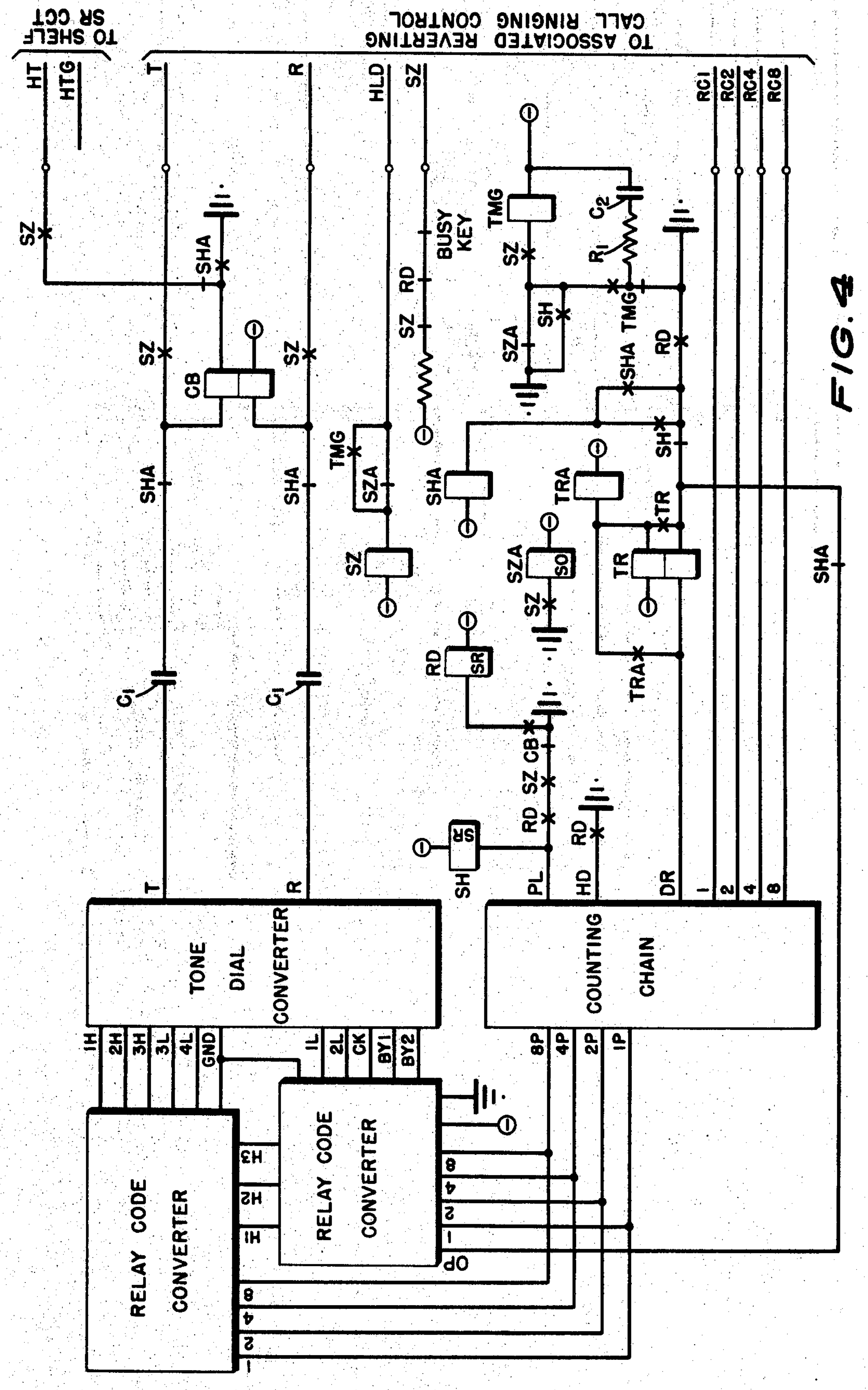

FIGS. 3*a*, 3*b* and 3*c* when combined from a schematic circuit diagram of the reverting call-ringing control of FIG. 1; and FIG. 4 is a schematic circuit diagram of the calling code register of FIG. 1.

In the drawings the contacts of the various relays forming elements of the schematic circuit diagrams are designated either by the symbol X or the symbol superimposed on a conductor. In accordance with accepted standards, it is to be understood that the symbol X indicates contacts which are closed only when the relay is energized and the symbol indicates contacts which are normally closed when the relay is deenergized and are open when the relay is energized. Also, in accordance with standard terminology, certain relays are designated within the symbol therefor with the letters SO and SR indicating they are slow-to-operate or slow-to-release relays, respectively.

SPECIFIC DESCRIPTION OF THE INVENTION

There are several basic types of reverting call circuits commonly used today, and the choice of system used depends upon many factors including the size of the exchange, the type of ringing and the type of line circuit employed. The present invention relates equally to the known arrangements, but is described herein specifically in connection with a particular reverting call system. This system is intended to provide reverting call by the calling party dialing the directory number of the called line, receiving a special tone to indicate that the called station is on the same line as the calling station, dialing a digit to identify the calling station and replacing the handset. The calling and called telephones will then be rung alternately, and when the called party answers, ringing will stop and the calling subscriber may lift his handset completing the transmission circuit However, the present invention may be easily applied to various other types of reverting call arrangements such as reverting call by special number, directory number without suffix, prefix to directory number, and so forth.

Referring now to FIG. 1, which discloses a common control telephone exchange of the type disclosed in copending application Ser. No. 552,282, filed May 23, 1966, now U.S. Pat. No. 3,327,076 assigned to a common assignee herewith, a universal junctor circuit 30 is provided for effecting interconnection between a line circuit 10 and various common control equipment through a line link network 20 and a service link network 50 for purposes of initiating establishment of a communication connection between that line circuit and another line circuit through a trunk link network 40, or in the case of a reverting call, a connection with a subscriber sharing the same line circuit. A register 60 is connected to the universal junctor on a time share basis via service link network 50 and serves to receive dialed instructions and in conjunction with junctor control 70 to control the establishment of the call between subscribers. A line marker 15 serves to detect and mark line circuits requesting service, detects a free register for association with the particular line circuit and establishes a path from the register through the service link network to a free junctor circuit and from the line circuit through the line link network to that junctor. A code translator 80 and a number translator 90 are also connected to the register 60 and serve to provide such information as subscriber equipment number, ringing code information, class of service information and other data relating to the calling and called subscribers.

In accordance with the present invention there is provided a reverting call trunk 45 for providing battery feedback through the trunk link network 40, the junctor 30 and the line link network 20 to the calling line circuit 10 to provide the required electrical potential necessary for operation of the subscriber equipment. However, in contrast to known reverting call arrangements, the reverting call trunk 45 does not include specific ringing control equipment or calling code register equipment, which equipment is provided in the form of a reverting call-ringing control 55 available through the service link network 50 and one or more calling code registers 65 and 75 selectively associated with the reverting call-ringing control 55.

Prior to a detailed description of the reverting call trunk 45, the reverting call-ringing control 55 and calling code register 65 and operation of the detailed circuits thereof, a general description of the operation of the reverting call arrangement in accordance with the present invention will be provided in connection with the basic block diagram of FIG. 1. When a call is initiated by a calling party lifting his handset, the change in line condition will be detected by the line marker 15 which will mark the line circuit and select a free register 60 for association with this particular call. Utilizing general path-finding principles, a free path is determined between the register 60 through the service link network and a free junctor 30 and is also determined from the marked line circuit 10 through the line link network 20 and the selected junctor 30. As soon as the connection is established, the register 60 will apply dial tone through the service link network 50, the junctor 30 and line link network 20 back to the calling line circuit 10. The calling subscriber will then dial the directory number of the called station, and upon receipt of this dialed information at the register 60, the register will call the number translator 90 into operation via the code translator 80, and a test will be made in any one of several ways to determine whether the called station is on the same line as the calling station. One satisfactory method is to compare the calling equipment number, supplied to the register from the number translator 90 at the time that the call is first initiated, with the called equipment number determined from the dialed directory number by code translator 80. If the two equipment numbers are the same, the two stations are parties on the same line and a reverting call situation exists.

When the number translator 90 determines that a reverting call is being made, it calls for a reverting call trunk 45 via jnctor control 70, which reverting call trunk is switched through the trunk like network to the calling junctor through marking of the junctor 30 via junctor control 70 and marking of the reverting call trunk 45 by trunk selector 85 controlled by code translator 80. The junctor control receives the called party identification including the ringing code thereof from the number translator and is informed that this is a reverting call. After this, the register 60 and translators 80 and 90 are released. The junctor control then calls for a reverting call-ringing control 55 to be attached via the service link network 50 to the calling junctor 30. The ringing code of the called party derived from the number translator 90 is then applied from the junctor control 70 to the reverting call-ringing control 55 where it is stored for subsequent use. The junctor control then releases, and the reverting call-ringing control extends its connection to one of two calling code registers 65 or 75 accessible to it.

The calling line receives a special high tone from the calling code register 65 or 75 through the reverting call-ringing control 55, the service link network 50, junctor 30, the line link network 20 and the line circuit 10 informing him that he has dialed the number of another party on his own line and should now dial his own party identification digit. When this has been done, the dialed digit, or multifrequency tone depending upon the subscriber equipment, will be applied through the reverting call-ringing control 55 to the calling code register 65 or 75 where it will be converted into a binary designation of the called subscriber ringing code. This ringing code is then applied to the reverting call-ringing control 55 for use in connection with the ringing control and the calling code register then releases.

A busy tone will then be applied from the reverting call-ringing control 55 to the calling party line circuit indicating to the calling party that he should restore his handset. When the calling party restores his handset after receiving busy tone on a reverting call, the reverting call-ringing control alternately rings the calling and called parties utilizing the particular ringing codes stored therein. When the call is answered by the called party, the reverting call-ringing control stops ringing and momentarily applies a special high tone to the called party line circuit to inform the answering party that the call is a reverting call. The reverting call-ringing control then releases and the reverting call trunk is switched for transmission. The calling party lifts his handset when ringing has stopped and a communication connection is established between the subscribers. The reverting call-ringing control 55 and calling code register 65 or 75 are then available during the course of the call for use in connection with other calls. Only the relatively inexpensive reverting call trunk along with the trunk link network, the junctor and the line link network to the line are required until the call has been released.

REVERTING CALL TRUNK

Figure 2:
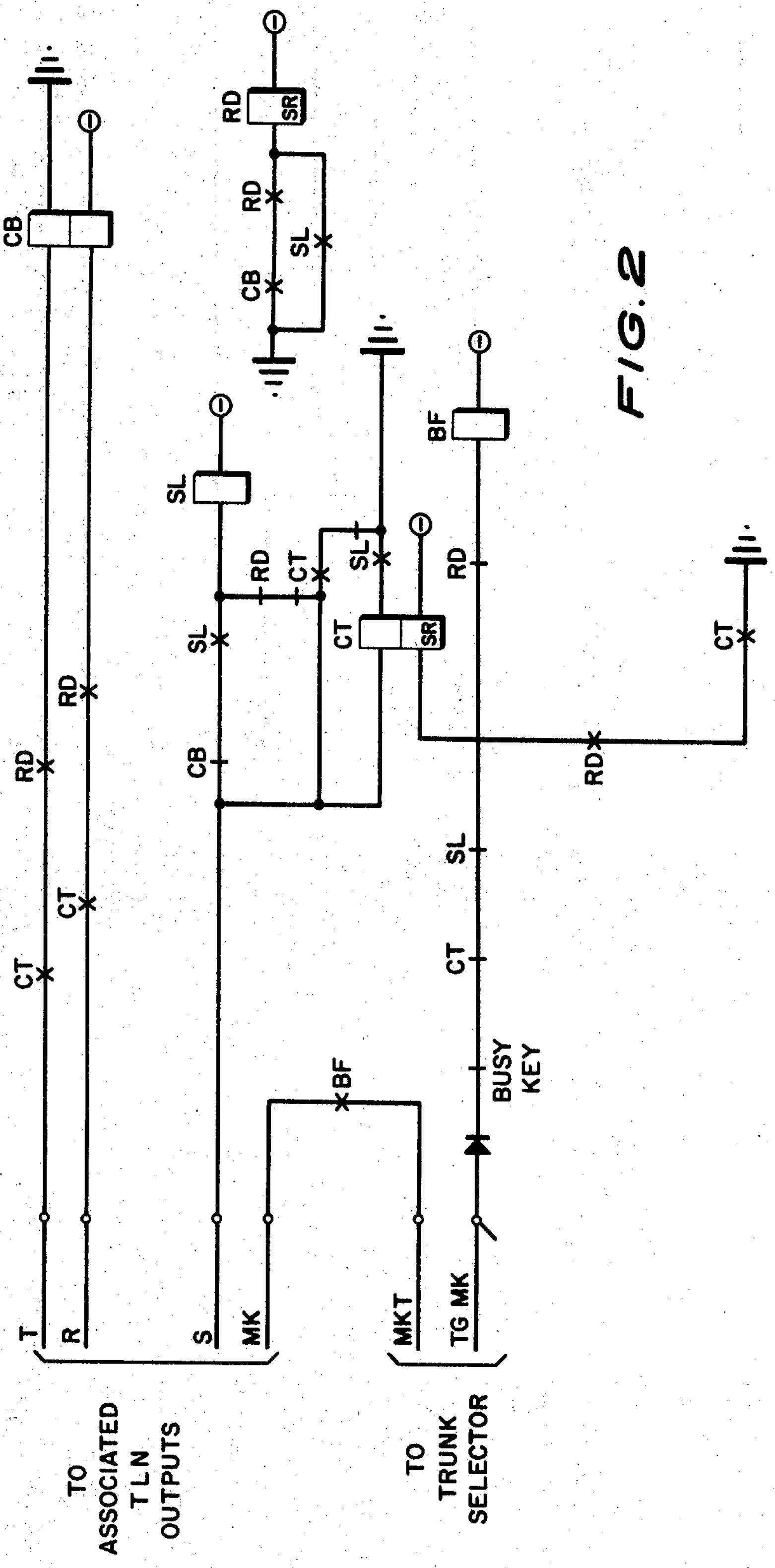
FIG. 2 is a schematic circuit diagram of the reverting call trunk of FIG. 1.

A plurality of reverting call trunks are provided for purposes of accommodating the reverting call traffic which might be expected at the exchange. A typical reverting call trunk such as utilized with the present invention is shown schematically in FIG. 2. In finding a free reverting call trunk, the trunk selector 85 applies marker signals in the form of a ground connection to the TGMK lead in each trunk in a successive manner. If the trunk is free, a marking of the TGMK lead will cause actuation of the BF relay in the trunk since the relays CT, SL, and RD having their normally closed contacts in series with the BF relay will be deenergized. Operation of the BF relay will provide connection between the MKT input to the trunk and the mark line output MK to the trunk link network. By means of a path-finding arrangement (not shown) a free path through the trunk link network from the MK lead of the reverting call trunk to a corresponding MK lead of the universal junctor is found by which a connection of the S lead from the junctor through the trunk link network to the reverting call trunk is established closing a transmission path on T and R leads therebetween.

Ground applied from the junctor on the S lead will then operate the SL relay via the normally closed contacts of the relays RD and CT. Once the relay SL is operated, ground is provided from the reverting call trunk by way of the closed contacts of the operated relay SL and one winding of the relay CT to the S line and serves to hold the crosspoints in the trunk link network and also the line link network after the reverting call-ringing control and calling code register release. A holding circuit is also provided for the relay SL from ground through the first set of closed SL contacts, the one winding of the relay CT, normally closed contacts of the relay CB and a second pair of closed SL contacts through the SL relay to battery until the reverting call trunk is connected to the line circuit. As soon as the SL relay is operated, the relay RD will be operated through closed contacts of relay SL from ground through to negative potential. Also, the application of ground through the one winding of the relay CT to battery connected to the SL relay operates the CT relay, which is then held by means of its second winding from negative battery through the closed contacts of relay RD and relay CT to ground. Operation of the relays RD and CT serve to connect the calling bridge relay CB through the trunk link network to the junctor and subsequently through the line link network to the line circuit for providing battery feed to the subscriber equipment. It is noted that the relays RD and CT are slow release relays so that operation of the calling bridge relay CB as a result of flashing of the switchhook by either of the parties after the call is established will not produce release of these relays.

As soon as the calling bridge relay CB is operated upon connection of the reverting call trunk to the line circuit, the normally closed contacts of the CB relay in series with the SL relay will open breaking the holding circuit for the SL relay and thereby deenergizing this relay. However, since the RD relay and the CT relay remain operated, the RD relay being operated from ground through the closed contacts of CB relay and RD relay to negative potential, ground will be applied back via the normally closed contacts of deenergized relay SL and the closed contacts of energized relay CT to the S lead through the trunk link network to hold the crosspoints therein.

After the call is completed, and both the calling and call subscribers replace their handset, the transmission circuit is opened the the relay CB will be deenergized. The energizing circuit for the relay RD which includes contacts of the relay CB will be immediately opened and the RD relay will be deenergized after a predetermined delay time. When the RD relay is deenergized, the holding circuit for the CT relay is opened and this relay will also be deenergized after a predetermined delay time thereby opening the circuit from ground to the S lead back through the trunk link network. The result is a release of the reverting call trunk and the crosspoints in the trunk link network and line link network to the line circuit, releasing the call.

RINGING CONTROL CIRCUIT

Looking to the reverting call-ringing control circuit illustrated in FIGS. 3*a* through 3*c*, the plurality of ringing control circuits are successively marked at input line ST by a type of service select circuit (not shown) which selects the first available control circuit under control of junctor control 70 by actuating the busy-free relay BF therein. As seen in FIG. 3*c*, a ringing control circuit will be available if the relay SW therein is deenergized providing normally closed contacts thereof in series with the relay BF and allowing energization thereof. If the relay SW in the marked ringing control circuit is energized, the mark will be applied to the BFH line to the type of service adapter (not shown) to continue the search for a free circuit.

As soon as the BF relay is energized, the line SZ (A) or SZ (B) (FIG. 3*a*) to the first and second choice calling code registers A and B, respectively, will be completed through the closed contacts of the BF relay to ground. It is noted that normally closed contacts of relay CRA are connected in the line SZ (B) so that selection is made of the calling code register A before the calling code register B. Assume that the calling code register A is available, the relay CRA having a winding in the line SZ (A) will be energized from negative potential applied on line SZ from the calling code register A. This register will be available provided the SZ and RD relays therein (FIG. 4) are not energized.

With operation of the relay CRA in the ringing control, the relay SW will be energized (FIG. 3*c*) from ground applied from the type of service selector through the closed contacts of operated relay BF and the closed contacts of operated relay CRA to negative potential. Energization of the relay SW will close contacts in the hold line HLD through the relay CRA from ground to the relay SZ in the calling code register A (FIG. 4). Operation of the SZ relay in the register A will open the line SZ therein preventing further seizing of the register by other reverting call-ringing control circuits. With operation of the switching relay SW the line from the type of service selector through to the BF relay will be opened and the relay will be deenergized. However, the contacts of the BF relay providing ground to the CRA relay are paralleled by contacts of the SW relay so that energization of the later relay will maintain a holding ground for the relay CRA in the reverting call-ringing control and the relay SZ in the calling code register A. Operation of the SW relay will also effect operation of the RD relay through contacts of relay CRA.

Actuation of the relay CRA, the relay RD and the relay SW serves to provide a connection of the lines T and R from the calling code register through the reverting call-ringing control to the service link network and the junctor. The relay SW also connects a holding ground to the S line through the service link network to the junctor for holding the closed crosspoints in the service link network.

Upon operation of the CRA relay and prior to operation of the SW relay the mark on the ST line to the ringing control circuit from the type of service selector is applied through the closed contacts of relay CRA to line ADST to the type of service adapter, which in turn provides a mark on line CT operating the CT relay in the ringing control circuit. Upon operation of the relay CT, relays RA1, RA2, RA4 and RA8, are connected along corresponding lines to the junctor control which applies the ringing code of the called party obtained from the number translator to the relays. These relays will be actuated in a binary sequence indicating the particular code of the party and will be held by connection from negative potential through the closed contacts of the relay themselves and the closed contacts of relay SW to ground. Once the relay SW is actuated, connection from the ringing control to the type of service adapter will be interrupted and the marking of the line CT providing energization of the CT relay will cease.

Operation of the CRA relay also provides connection of the lines RC1 through RC8 to the calling code register A which applies the calling party ringing code to the relays RC1, RC2, RC4 and RC8, which relays are operated in a binary sequence indicative of the ringing code of the party derived in the calling code register, as indicated below. Upon operation of the relays, they are held through their own closed contacts in series with ground through the contacts of the SW relay. In a like manner, if the relay CRB associated with the calling code register B had been actuated instead of the relays CRA, the lines RC1 through RC8 connected to the calling code register B would provide the ringing code for the respective relays. Thus, the relay CRA (or CRB as the case may be) makes possible application to and storage of both the calling and called party ringing codes in the reverting call-ringing control.

Looking now to FIG. 4, when the calling party has completed dialing of the called number and the reverting call-ringing control and calling code register are connected through the service link network and the junctor via the line link network to the line circuit, the calling code register will receive a high-frequency tone on line HT from suitable shelf equipment, which tone is applied through closed contacts of the SZ relay and normally closed contacts of deenergized relay SHA through the first winding of the calling bridge relay CB in the code register to the T transmission line where it is extended through closed contacts of relay SZ to the reverting call-ringing control due to actuation of the relays CRA, SW and RD and through the service link network, the junctor, and the line link network to the line circuit. The calling party therefore receives the high-frequency tone indicating that he has dialed a party on his own line and should dial his identifying number.

The dialed digit from the calling party representing the ringing code of the party is applied through the service link network on the transmission lines T and R and through the reverting call-ringing control to the calling code register. The impulses making up the digit are repeated by the calling bridge relay CB or in the case of multitone dialing, the tone is applied to the tone dial converter via capacitors C. The calling code register then determines the ringing code for the calling party from the received digit in the manner to be described hereinafter, applies this code to the ringing control and then releases its connection thereof.

As soon as the calling code register releases, the relay CRA in the ringing control is deenergized and a connection is established between the relay CB therein and the transmission lines T and R connected through the service link network, the junctor and the line link network to provide battery feed for the subscriber equipment in place of that previously provided via that calling bridge relay CB in the calling code register. At this point, the relays RC1 through RC8 and RA1 through RA8 (FIG. 3*b*) have been energized in the proper binary sequence establishing the ringing code for both the calling and called parties. At this time with relay RDA operated and relay CB connected to the transmission lines T and R, a busy-tone signal received on line BT (FIG. 3*a*) from suitable shelf equipment will be applied through one winding of the CB relay to the line T over which it is conveyed to the calling subscriber indicating to him that he should replace his handset. The calling party then replaces his handset deenergizing the relay CB in the ringing control.

As soon as one of the relays RC1 through RC8 is energized, and while the relay CRA (or relay CRB) is still energized, the relay RDA (FIG. 3*c*) will be energized from negative potential through the closed contacts of deenergized relay RT to ground. Once the relay RDA is energized, it will be held in this condition by its own closed contacts in parallel with the contacts of relays CRA and CRB, which may thereafter be deenergized. With the relay RDA energized the relay RCT will be energized from negative potential through the relay to ground. With deenergization of the relay CRA, the relay SW will remain energized through the closed contacts of relay RD or relay RCT to ground. The relay RD remains operated after the relay CRA is deenergized through the closed contacts of relay SW and RDA and the closed contacts of relay CB until the calling party replaces his handset deenergizing the relay CB. At that time the relay RD is deenergized.

A plurality of ringing signals are applied continuously from a plurality of tone generators GEN 1 through GEN 5, the outputs of which are applied to first and second identical networks of the contacts of relays RC1 through RC8 and RA1 through RA8. The manner in which the various relays are energized or remain deenergized provide for connection of a particular one of the tone generators GEN 1 through GEN 5 through the contacts of either the relay INC or the relay INA in the interrupter portion of the circuit to the T and R transmission lines. The output of these networks is applied through one winding of the relay RT and is connected either to the transmission line R or the transmission line T depending upon whether the relay RV is energized or deenergized, as will be described hereinbelow. With the relay RDA energized and the relay RD deenergized this connection is made possible.

The interrupter section is shown in FIG. 3*c* as including interrupter control signals INT 1 and INT 2 applied to respective input lines. With the relay RD deenergized and the relay RDA energized the interrupter signals are applied respectively to first and second combinations of the contacts of relays RC1 through RC8 and RA1 through RA8. With this arrangement the relays INA and INC are actuated alternately at the respective intervals INT 1 and INT 2. The relay RV which effects a connection of the ringing signal to the transmission line T instead of the transmission line R is operated alternately with either the relay INA or the relay INC so that the ringing signal is applied to the line alternately for the called and the calling stations.

When the called party goes off hook, the ring trip relay RT is operated after a time deenergizing the relay RDA, providing connection of the CB relay to the transmission lines T and R through the closed contacts of the relay RCT, which has a slow release feature, and the closed contacts of deenergized relays RDA and RD. Once the ring trip relay RT is operated it immediately deenergizes the relay RDA thus preventing further operation of the relay RD when the relay CB is operated upon lifting of the handset by the called party. The relay RCT will deenergize also a short time after RDA so that with RCT, RD, and CT deenergized, the relay SW will deenergize disconnecting the reverting call-ringing control circuit from the system altogether. However, since this does not occur until the relay RCT is deenergized, time is provided between the lifting of the handset by the called party and disconnection of the ringing control circuit for applying the high-tone signal through the winding of the relay CB to the transmission line T to the called party indicating to him that he has responded to a reverting call.

When the called party picks up his receiver for the first time the relay RCT will be energized and the relay RDA, as soon as the ring trip relay is operated, will be deenergized and a high-tone signal will be applied from the supervisory shelf circuit on line HT through one winding of the relay CB to the transmission line T; however, as soon as the relay RCT is deenergized, due to its slow release feature after the deenergization of the relay RDA, this high-tone signal will be disconnected from the line. Also, relay SW will be released, opening the T, R and S leads. This releases the service link network and causes the junctor to switch the line through to the reverting call trunk. The reverting call-ringing control is now free.

When the calling party notices that ringing has been interrupted, he picks up his handset and communication is established between the parties with the reverting call trunk providing battery feed for the connection.

CALLING CODE REGISTER

Referring now to the calling code register illustrated in FIG. 4, with ground applied to the SZ input from the reverting call-ringing control, the calling code register will provide negative potential on this line to actuate the CRA or CRB relay in the ringing control which results in an application of ground back on the HLD input to the calling code register completing the connection through the normally closed contacts of deenergized relay SZA, the winding of the SZ relay and negative potential. SZ will then be energized connecting the transmission lines T and R in the calling code register to the corresponding transmission lines T and R in the reverting call-ringing control.

Energization of the SZ relay completes circuit from negative potential through the winding of the TMG timing relay, the closed contacts of relay SZ and the normally closed contacts of deenergized relay SZA to ground actuating the TMG relay. The capacitor C2 previously charged in the circuit including the negative potential, capacitor C2, resistor R1, and normally closed contacts of relay TMG to ground, is connected in parallel with the timing relay TMG upon actuation thereof and therefore retains its charge by remaining in connection with ground through the closed contacts of relay SZA. which is a slow-to-operate relay.

When the relay SZA operates as a result of energization of the SZ relay, the timing relay TMG will be separated from ground due to opening of the normally closed contacts of relay SZA but will remain energized due to the discharging of capacitor C2 through its operating winding to negative potential. When the capacitor C2 discharges the timing relay TMG will remain energized and the SZ relay will remain connected to the HLD line to the reverting call-ringing control. As soon as the transmission lines T and R in the calling code register are connected through the reverting call-ringing control, the service link network, the junctor, and the line link network to the line circuit, the CB relay in the calling code register will be operated due to completion of the circuit across the transmission lines resulting from the off-hook condition at the subscriber circuit. Operation of the CB relay provides for connection of ground to the relay RD energizing this relay. With the SZ relay energized through the contacts of the timing relay TMG, as a result of the discharging of capacitor C2, a high-tone generator will be connected through the closed contacts of the SZ relay, the normally closed contacts of deenergized relay SHA, and one winding of the relay CB to the transmission line T. A high-tone signal is applied through the transmission line T to the reverting call-ringing control and eventually to the calling subscriber line circuit indicating to the calling subscriber that he has dialed the number of another station on his own line and should dial his ringing code at this time. It is noted at this time that the time available to the the calling party for dialing the ringing code after the high-tone signal is applied to the line circuit is limited by the discharged time of the capacitor C2. If the subscriber should wait too long before dialing his ringing code digit, the capacitor C2 will completely discharge deenergizing the relay TMG and releasing connection to the relay SZ with the result that the calling code register will release from the reverting call-ringing control.

The calling subscriber then dials his ringing digit either by the standard impulse dial or by multifrequency tone dialing and the dialed signal is transmitted from the line circuit through the junctor and the reverting call-ringing control to the calling code register. In the case where an impulse dial is utilized, the impulses will be detected by the relay CB which repeats the impulses so that the contacts in series with the line PL to the counting chain will be opened and closed in synchronism with the dialed impulses. At the same time, the receipt of the first dialed impulse will deenergize the relay CB providing connection from ground through these contacts and the contacts of energized relays SZ and RD to operate the shut relay SH. Operation of the SH relay effects operation of the relay SHA through the contacts of the SH relay and the RD relay to ground. Once operated, the SHA relay is maintained on operated condition through its own holding circuit. The SHA relay serves to disconnect the transmission lines T and R from the tone dial converter in the case where the dialed signals received by the calling code register are in the form of dialed impulses rather than multifrequency tone signals.

Where multifrequency tone signals are received, the CB relay will not be deenergized and the tone signals will be applied through the capacitors C1 in the lines T and R directly to a tone dial converter where in, conjunction with first and second relay code converters the dial tones are converted to equivalent dialing impulses, which are then applied to the counting chain in the same manner as the signals from dialing impulses would be applied to the PL input to the counting chain driving the counting chain to a binary count which is produced at the outputs 1, 2, 4, and 8 therefrom.

Once the relay SH has been operated, operating the relay SHA, the high-tone generator is immediately disconnected from the transmission line T and ground is connected through the CB relay at this circuit. With operation of the SH relay upon receipt of the first dialed impulse a holding connection for the timing relay TMG is provided in parallel with the normal closed contacts of operated relay SZA so as to insure maintenance of the operation of timing relay TMG during the entire time for receipt of the dialing impulses. In connection with receipt of multifrequency dial tone, since but a single tone signal (dual frequency) is required for identification of the ringing code no additional time is needed to maintain connection of the transmission lines T and R to the reverting call-ringing control after the tone is received, therefore the timing relay can be allowed to deenergize without delay. Once the tone is received by the tone dial converter the ringing code in binary form will be provided at the outputs RC1 through RC8.

Where the calling party ringing code is received by the way of dialed impulses, upon receipt of the final dialed impulse the calling bridge relay CB will remain energized thereby separating the shut relay SH from its ground connection. After a delay time based upon these slow release properties of the shut relay SH this relay will release. During the time that the shut relay is energized a charging circuit connection is once again established from negative potential through the capacitor C2, the resistor R1, the closed contacts of energized relay TMG and the closed contacts of the shut relay to ground. Capacitors C2 will therefore be charged during the time of receipt of the dialed digits. Once the shut relay releases, the capacitor C2 will once again discharge through the timing relay TMG maintaining this relay in operation until the capacitor is discharged. When the calling ringing code has been transferred to the reverting call-ringing control, the circuit to the SZ relay is opened. The SZ relay in releasing disconnects the calling code register from the ringing control. The TMG relay will release immediately after SZ releases without waiting for the completion of its timing cycle, due to the opening of its winding from the capacitor register network C2—R1. The calling code register is then free.

It is seen from the above operation that the capacitor C2 provides for a timing interval which is substantially constant being increased only by the time of receipt of the dialed impulses so that the calling code register remains connected to the reverting call-ringing control for a predetermined time plus the time required for receipt of dialed impulses. If dialing is not completed within this timing interval, the call will be dismissed from the calling code register to make it available for other calls.

It should now be apparent that the present invention provides a reverting call system wherein the ringing control circuits and especially the calling code registers required may be materially reduced and the manner in which this equipment is made available greatly increases the efficiency and economy of operation of the overall exchange equipment.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. In common control telephone exchanges including at least one line circuit, register means for detecting signals requesting a communication connection between first and second subscribers sharing said line circuit, and a junctor circuit interconnecting said register means and said line circuit, a reverting call arrangement comprising a reverting call trunk connected on a time share basis to said line circuit for providing the battery feed required for the use of the subscriber equipment during a reverting call, reverting call-ringing control means selectively connected to said junctor circuit on a time share basis with respect to said reverting call trunk for applying ringing signals alternately to said first and second subscribers and a separate calling code register connected to said reverting call-ringing control means on a time share basis with respect to said reverting call trunk for determining the ringing code of one of said first and second subscribers from signals received from said line circuit and for applying said ringing code to said ringing control means in control thereof.

2. The combination defined in claim 1 wherein said calling code register includes first means responsive to the connection of said calling code register to said line circuit for applying a distinctive tone signal to said first subscriber initiating the call indicating the existence of a reverting call situation.

3. The combination defined in claim 2 wherein said calling code register further includes second means for disconnecting said first means in response to an open line circuit condition subsequent to connection of said calling code register to the closed line circuit.

4. The combination defined in claim 1 wherein said calling code register includes counting means for converting a signal having a decimal value to a plurality of signals having a binary value corresponding to said decimal value and means for applying said plurality of signals to said reverting call-ring control means.

5. The combination defined in claim 4 wherein said calling code register further includes calling bridge relay means responsive to received dialing impulses from said line circuit for advancing said counting means.

6. The combination defined in claim 4 wherein said calling code register further includes tone conversion means for advancing said counting means in response to a tone representing a decimal designation received from said line circuit.

7. The combination defined in claim 1 wherein said calling code register includes timing means for automatically disconnecting said calling code register from said reverting call-ringing control a predetermined time after the connection thereof.

8. The combination defined in claim 7 wherein said timing means includes a timing relay energized upon connection of said calling code register to said calling code ringing control and capable of disconnecting said calling code register upon deactivation thereof, and a timing circuit including a resistance and a discharging capacitance in series with said timing relay providing the sole means of maintaining said relay in the operated state.

9. The combination defined in claim 8 wherein said calling code register further includes means responsive to the receipt of dialing impulses for extending the discharge time of said capacitance by the period of said pulses.

10. The combination defined in claim 1 wherein said reverting call-ringing control means includes a first store for storing the ringing code of said first calling subscriber received from said calling code register and a second store for storing the ringing code of said second subscriber received from said register means, a plurality of ringing signal generators, and network control means for applying the ringing signal of said first and second subscribers alternately to said line circuit in accordance with the ringing code stored in said first and second stores.

11. The combination defined in claim 1 wherein said reverting call-ringing control includes means responsive to release of said calling code register for applying a momentary busy-tone signal to said line circuit.

12. The combination defined in claim 10 wherein said reverting call-ringing control includes means responsive to said second subscriber going off hook in answer to said ringing for disabling said network control means and for applying a momentary high-tone signal to said line circuit indicating a reverting call situation.